US012600255B2

(12) United States Patent
Saita et al.

(10) Patent No.: US 12,600,255 B2
(45) Date of Patent: *Apr. 14, 2026

(54) CONTROL APPARATUS, METHOD AND COMPUTER READABLE STORAGE MEDIUM FOR POWER EXCHANGE OF BATTERY WITH OUTSIDE OF MOBILE OBJECT

(71) Applicant: HONDA MOTOR CO.,LTD., Tokyo (JP)

(72) Inventors: Akira Saita, Tokyo (JP); Yuki Ito, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 436 days.

This patent is subject to a terminal disclaimer.

(21) Appl. No.: 18/191,000

(22) Filed: Mar. 28, 2023

(65) Prior Publication Data

US 2023/0311694 A1 Oct. 5, 2023

(30) Foreign Application Priority Data

Mar. 30, 2022 (JP) ................................. 2022-055794

(51) Int. Cl.
B60L 53/62 (2019.01)
G05B 19/042 (2006.01)
G07C 5/04 (2006.01)

(52) U.S. Cl.
CPC ............ B60L 53/62 (2019.02); G05B 19/042 (2013.01); G07C 5/04 (2013.01); B60L 2240/549 (2013.01); G05B 2219/2639 (2013.01)

(58) Field of Classification Search
CPC . B60L 53/62; B60L 2240/549; G05B 19/042; G05B 2219/2639; G07C 5/04
(Continued)

(56) References Cited

U.S. PATENT DOCUMENTS

2015/0352962 A1 12/2015 Hokoi
2016/0105044 A1 4/2016 Yamaguchi
(Continued)

FOREIGN PATENT DOCUMENTS

CN 105172784 A 12/2015
CN 106972583 A 7/2017
(Continued)

OTHER PUBLICATIONS

Office Action issued for counterpart Japanese Application No. 2022-055794, transmitted from the Japanese Patent Office on Jan. 16, 2024 (drafted on Jan. 9, 2024).
(Continued)

*Primary Examiner* — Md Azad

(57) ABSTRACT

A control apparatus configured to: store a guaranteed value of a parameter indicating usage of a power storage system including a battery included in a mobile object at a predetermined time point in the future; calculate a value of the parameter due to travelling that is a value of the parameter at the predetermined time point due to travelling of the mobile object; calculate, based on difference values obtained by subtracting the value of the parameter due to travelling from the guaranteed values, a usable remaining usable amount of the battery for operations other than the travelling of the mobile object until the predetermined time point; and control, based on the remaining usable amount, to conduct power transmission and reception between outside of the mobile object and the battery.

12 Claims, 14 Drawing Sheets

(58) Field of Classification Search
USPC ......................................................... 700/295
See application file for complete search history.

(56) References Cited

U.S. PATENT DOCUMENTS

| | | | |
|---|---|---|---|
| 2019/0061552 A1 | 2/2019 | Amari | |
| 2019/0217850 A1 | 7/2019 | Kai | |
| 2020/0384878 A1 | 12/2020 | Pontefract | |
| 2020/0384887 A1 | 12/2020 | Yokoyama | |
| 2021/0033680 A1 | 2/2021 | Ukumori | |
| 2021/0061123 A1 | 3/2021 | Suzuki | |
| 2021/0284039 A1 | 9/2021 | Ando | |
| 2021/0295619 A1* | 9/2021 | Tsuchiya | B60L 53/62 |
| 2021/0379999 A1 | 12/2021 | Yang | |
| 2021/0380015 A1* | 12/2021 | Nakaishi | H02J 7/0047 |
| 2022/0200335 A1* | 6/2022 | Hamada | B60L 50/70 |
| 2022/0289060 A1* | 9/2022 | Tsuchiya | H02J 13/00006 |
| 2022/0376522 A1 | 11/2022 | Kawamura | |
| 2023/0155409 A1* | 5/2023 | Matsumura | H02J 7/00034 |
| | | | 320/134 |
| 2023/0219447 A1* | 7/2023 | Ehara | B60L 53/68 |
| 2023/0226939 A1* | 7/2023 | Ehara | B60L 53/62 |
| | | | 320/109 |
| 2024/0097503 A1* | 3/2024 | Hiramatsu | H02J 50/80 |

FOREIGN PATENT DOCUMENTS

| | | | |
|---|---|---|---|
| CN | 110040122 A | 7/2019 | |
| CN | 112018795 A | 12/2020 | |
| CN | 113165550 A | 7/2021 | |
| CN | 113602127 A | 11/2021 | |
| JP | 2011120327 A | 6/2011 | |
| JP | 6596472 B2 | 10/2019 | |
| JP | 2019168453 A | 10/2019 | |
| JP | 2020012695 A | 1/2020 | |
| JP | 2021019400 A | 2/2021 | |
| JP | 2021052529 A | 4/2021 | |
| JP | 6892895 B2 | 6/2021 | |
| JP | 2021100322 A | 7/2021 | |
| JP | 6918877 B2 | 8/2021 | |
| JP | 2021149788 A | 9/2021 | |
| JP | 2021150988 A | 9/2021 | |

OTHER PUBLICATIONS

Office Action issued for counterpart Chinese Application 202310285416. 1, issued by The State Intellectual Property Office of People's Republic of China on Nov. 28, 2025.
Office Action issued for related Chinese Application 202310285414. 2, issued by The State Intellectual Property Office of People's Republic of China on Dec. 23, 2025.

* cited by examiner

| VEHICLE ID | PRIORITY |
|:---:|:---:|
| 1 | A3 |
| 2 | A1 |
| 3 | A2 |
| 4 | B |
| ⋮ | ⋮ |

*FIG.9*

USAGE OF APPLIANCE

| NUMBER OF STARTUPS | | | | |
|---|---|---|---|---|
| | | A | B | C |
| OPERAT-ING TIME | A | USE | RESTRICT THE USE | PROHIBIT THE USE |
| | B | RESTRICT THE USE | | |
| | C | PROHIBIT THE USE | | |

✖

USAGE OF BATTERY

| AMOUNT OF ELECT-RIC POWER | A | USE |
|---|---|---|
| | B | RESTRICT THE USE |
| | C | PROHIBIT THE USE |

CONTROL APPARATUS, METHOD AND COMPUTER READABLE STORAGE MEDIUM FOR POWER EXCHANGE OF BATTERY WITH OUTSIDE OF MOBILE OBJECT

The contents of the following Japanese patent application(s) are incorporated herein by reference:
NO. 2022-055794 filed in JP on Mar. 30, 2022.

BACKGROUND

1. Technical Field

The present invention relates to a control apparatus, a method and a computer readable storage medium.

2. Related Art

In recent years, in order to be able to ensure that more people have access to affordable, reliable, sustainable, and advanced energy, research and development is being conducted on secondary batteries that contribute to energy efficiency. In Patent Document 1 to 4, techniques related to charging and discharging of a secondary battery included in a vehicle are described.

PRIOR ART DOCUMENT

Patent Document 1: Japanese Patent No. 6892895
Patent Document 2: Japanese Patent No. 6596472
Patent Document 3: Japanese Patent Application Publication No. 2011-120327
Patent Document 4: Japanese Patent No. 6918877

BRIEF DESCRIPTION OF THE DRAWINGS

FIG. 9 illustrates the priority set to the battery 12 of each of the vehicles 10.

DESCRIPTION OF EXEMPLARY EMBODIMENTS

Hereinafter, (some) embodiment(s) of the present invention will be described. The embodiment(s) do(es) not limit the invention according to the claims. In addition, not all of the combinations of features described in the embodiments are essential to the solution of the invention.

Figure 1:
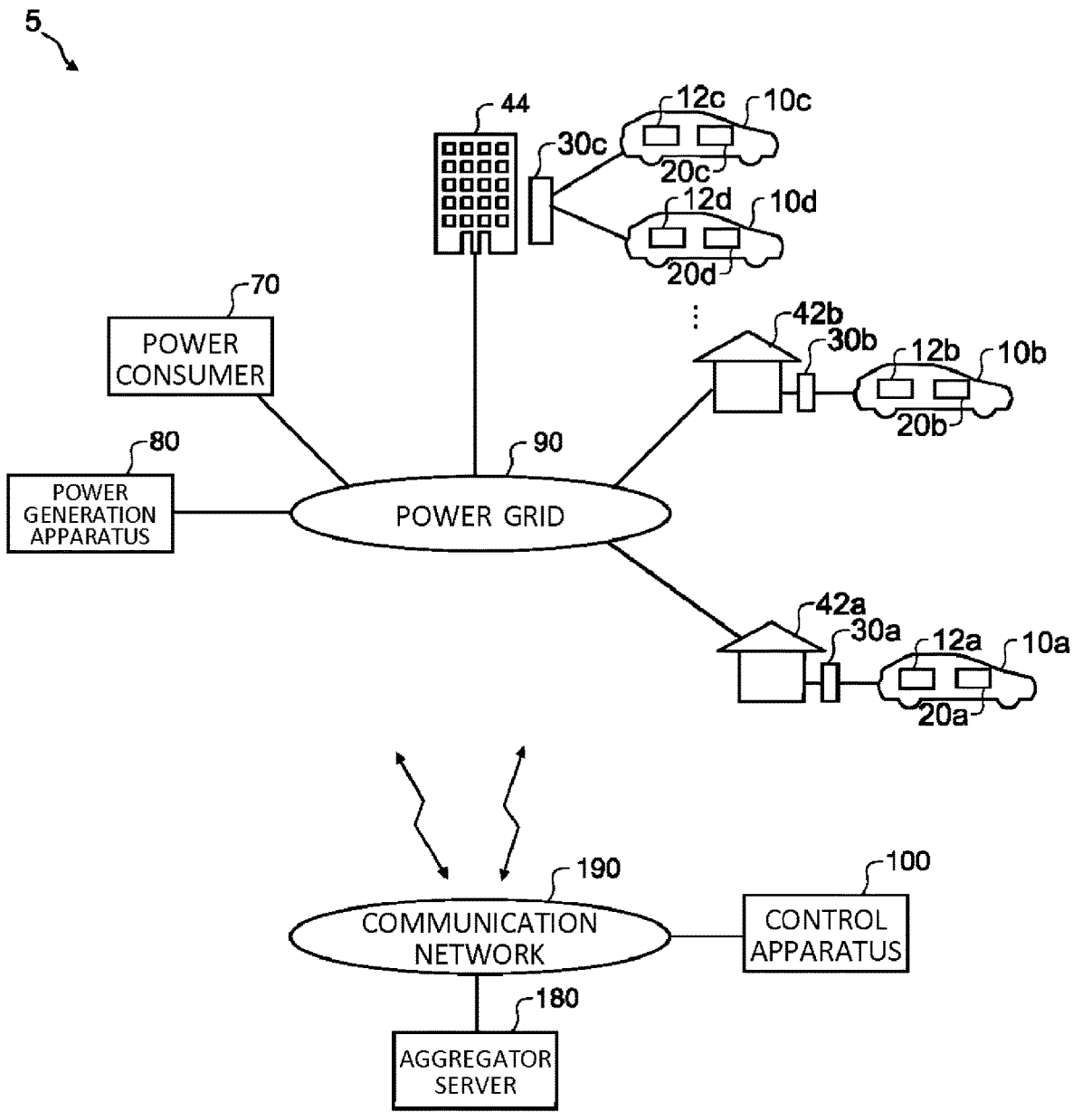
FIG. 1 conceptually illustrates a utilization form of a system 5 in an embodiment.

FIG. 1 conceptually illustrates a utilization form of a system 5 in an embodiment. The system 5 includes a charging and discharging facility 30a, a charging and discharging facility 30b, a charging and discharging facility 30c, a power generating apparatus 80, a control apparatus 100, an aggregator server 180, a vehicle 10a, a vehicle 10b, a vehicle 10c and a vehicle 10d.

The vehicle 10a, the vehicle 10b, the vehicle 10c and the vehicle 10d respectively include a battery 12a, a battery 12b, a battery 12c and a battery 12d. The vehicle 10a, the vehicle 10b, the vehicle 10c and the vehicle 10d respectively include a control apparatus 20a, a control apparatus 20b, a control apparatus 20c and a control apparatus 20d. In the present embodiment, the vehicle 10a, the vehicle 10b, the vehicle 10c and the vehicle 10d may be collectively referred to as a "vehicle 10". The battery 12a, the battery 12b, the battery 12c and the battery 12d may be collectively referred to as a "battery 12". The control apparatus 20a, the control apparatus 20b, the control apparatus 20c and the control apparatus 20d may be collectively referred to as a "control apparatus 20". The charging and discharging facility 30a, the charging and discharging facility 30b and the charging and discharging facility 30c may be collectively referred to as a "charging and discharging facility 30".

The control apparatus 100 is connected to the aggregator server 180 through a communication network 190. The control apparatus 100 can communicate with a charging and discharging facility 30 through the communication network 190. The control apparatus 100 controls the charging and discharging facility 30 through the communication network 190. The control apparatus 100 communicates with the control apparatus 20 of the vehicle 10 through the communication network 190, and acquires various information of the vehicle 10 including travelling history as well as the SOC (State of Charge) and SOH (State of Health) of the battery 12 of the vehicle 10.

The charging and discharging facility 30, a power consumer 70 and the power generating apparatus 80 are connected to a power grid 90. The power generating apparatus 80, for example, includes a power plant managed by an electric utility. The electric power generated by the power generating apparatus 80 is suppliable to the charging and discharging facility 30 and the power consumer 70 through the power grid 90. The power grid 90 is, for example, an electric power system.

Each of the charging and discharging facility 30 respectively conducts charging and discharging of the battery 12 mounted on the vehicle 10 that is connected to each of them. The vehicle 10 is, for example, an electric vehicle. The battery 12 is a battery for supplying electric power for travelling of the vehicle 10. The vehicle 10 may be a privately owned vehicle, a vehicle used by a business for its business, a shared car and so on.

The charging and discharging facility 30a is provided in a dwelling unit 42a, and conducts charging and discharging of the battery 12a of the vehicle 10a connected to the charging and discharging facility 30a. When conducting discharging of the battery 12*a*, the electric power provided from the battery 12*a* may be consumed with an electric power load inside the dwelling unit 42*a*, or may be provided to the power grid 90 through a power line disposed in the dwelling unit 42*a*. The charging and discharging facility 30*b* is provided in the dwelling unit 42*b*, and conducts charging and discharging of the battery 12*b* of the vehicle 10*b* connected to the charging and discharging facility 30*b*. When conducting discharging of the battery 12*b*, the electric power provided from the battery 12*b* is consumed with an electric power load inside the dwelling unit 42*b*, or is provided to the power grid 90 through a power line disposed in the dwelling unit 42*b*. The charging and discharging facility 30*c* is a charging and discharging facility provided in a facility 44, and conducts charging and discharging the battery 12*c* and the battery 12*d* mounted on the vehicle 10*c* and the vehicle 10*d* connected to the charging and discharging facility 30*c*. When conducting discharging of the battery 12*c* and the battery 12*d*, the electric power provided from the battery 12*c* and the battery 12*d* may be consumed with an electric power load within the facility 44, or may be provided to the power grid 90 through the power line disposed in the facility 44.

Each charging and discharging facility 30 can charge the battery 12 with the electric power received from the power grid 90. The charging and discharging facility 30 can cause the battery 12 to discharge and conduct power transmission to the power grid 90.

When conducting the transmission and reception of the electric power between the power grid 90 and the battery 12, the charging and discharging facility 30 and the control apparatus 20 of the vehicle 10 conduct charging and discharging of the battery 12 according to the control of the control apparatus 100. For example, when a power shortage is occurring in the power grid 90, the control apparatus 100 can cause the battery 12 to conduct power transmission to the power grid 90 by instructing the charging and discharging facility 30 and the control apparatus 20 to cause the battery 12 to discharge electric power. When power surplus in the power grid 90 is occurring, the control apparatus 100 can mitigate the power surplus of the power grid 90 by instructing the charging and discharging facility 30 and the control apparatus 20 to cause the battery to charge electric power. In this manner, the control apparatus 100 can provide primary regulating power, secondary regulating power, tertiary regulating power and so on in the power grid 90 in conjunction with the charging and discharging facility 30 and the control apparatus 20. This enables the control apparatus 100 to aggregate the plurality of batteries 12 mounted on the plurality of vehicles 10, to provide an electric power resource for the power grid 90.

The aggregator server 180 is, for example, a server used by an electric power aggregator. The aggregator server 180 conducts power transactions in the electricity market. The control apparatus 100 communicates with the aggregator server 180 to provide electric power in a required amount to the power grid 90. For example, the control apparatus 100 controls charging and discharging of the battery 12 for the charging and discharging facility 30 and the control apparatus 20 according to the demand from the aggregator server 180 to provide electric power in an amount according to the demand.

Figure 2:
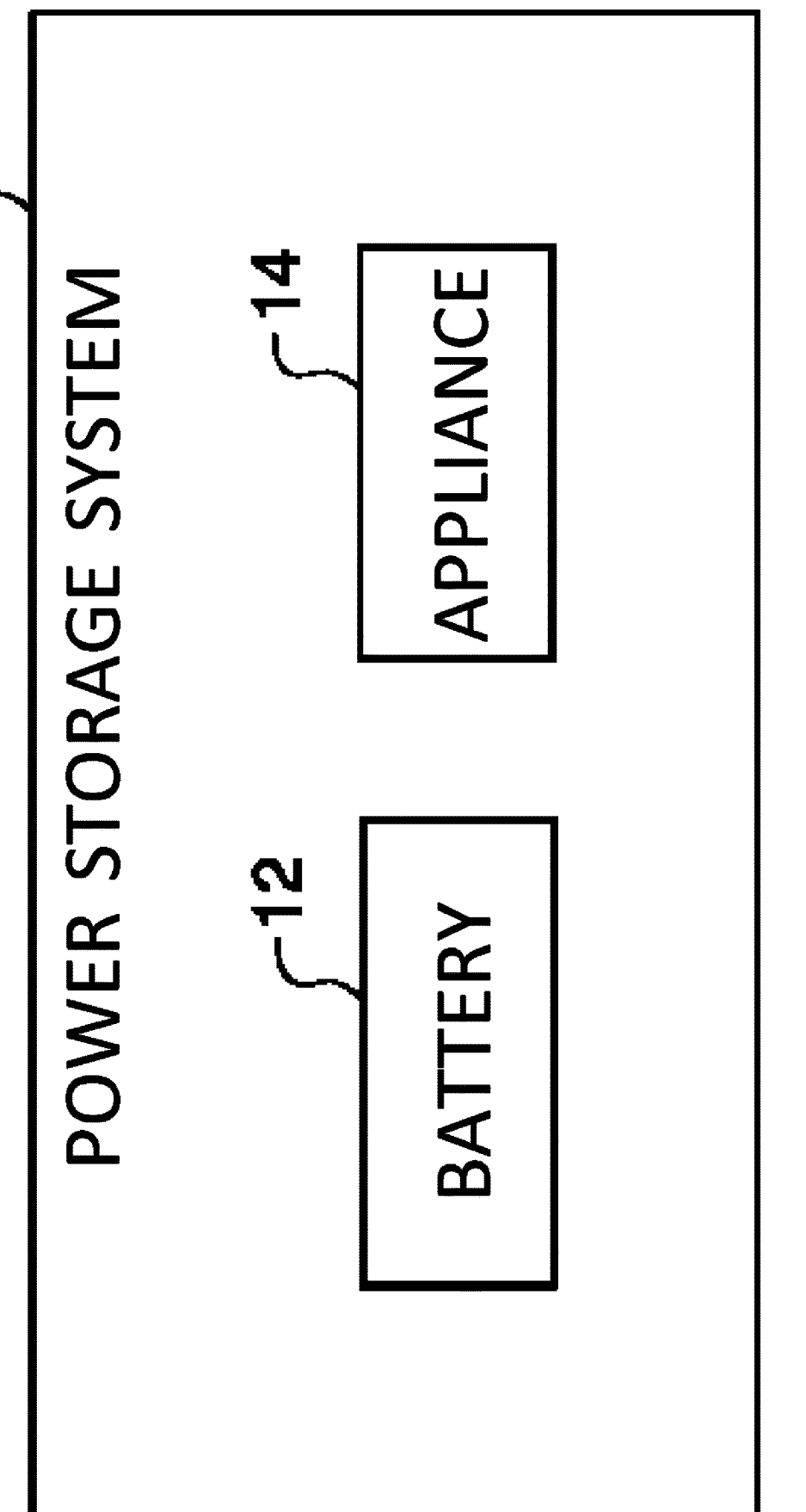
FIG. 2 conceptually illustrates a configuration of a power storage system 18 included in a vehicle 10.

FIG. 2 conceptually illustrates the configuration of the power storage system 18 included in the vehicle 10. The power storage system 18 includes a battery 12 and an appliance 14. The appliance 14 is an appliance that is required to operate for the battery 12 to conduct charging and discharging. The appliance 14 includes an electrical component such as a relay, a switch, and a DC-DC converter, a control appliance such as an ECU (an Electronic Control Unit), a communication appliance such as a TCU (a Telematics Control Unit) and so on. The appliance 14 includes at least a part of the control apparatus 20.

Figure 3:
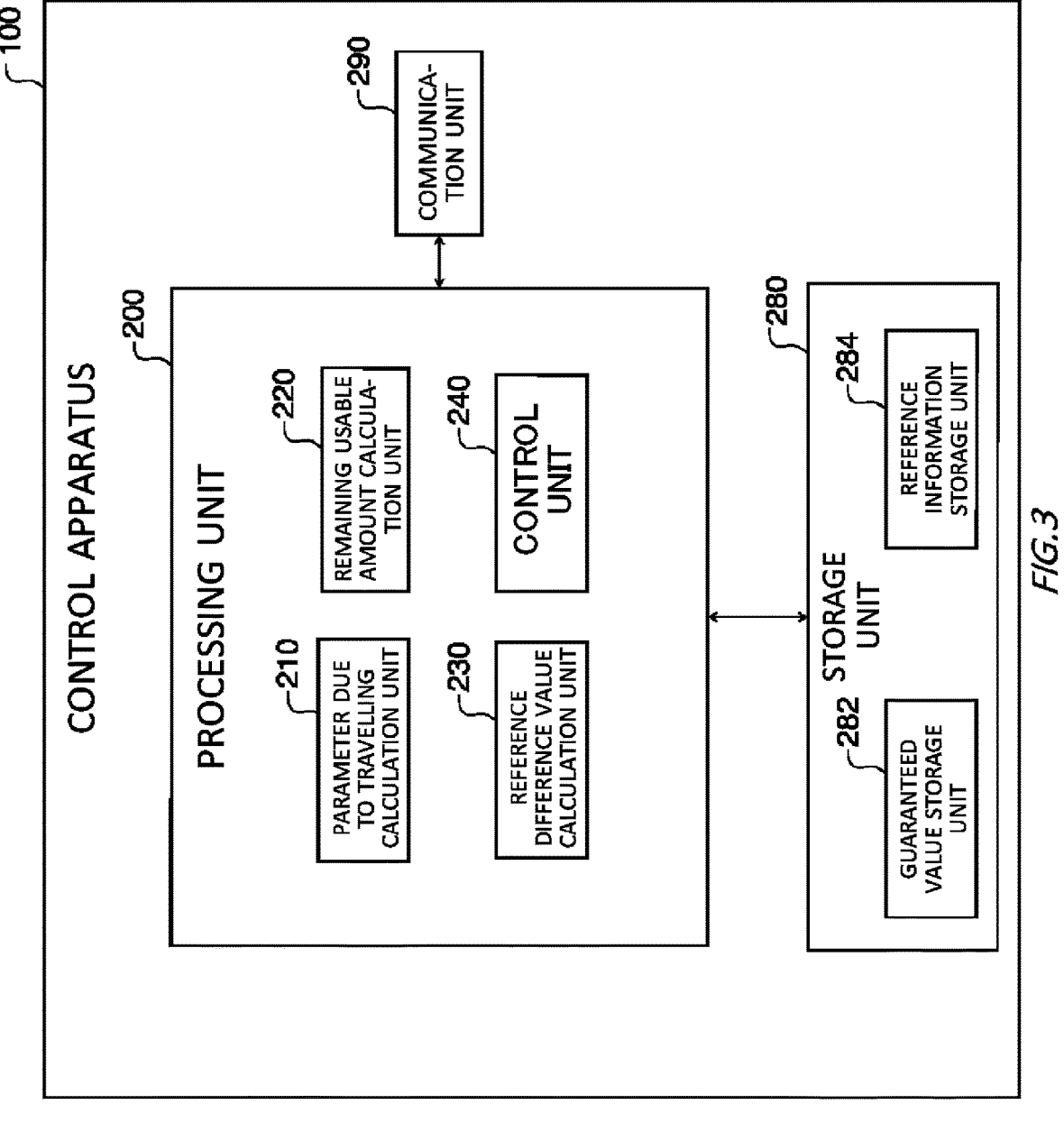
FIG. 3 illustrates one example of a system configuration of a control apparatus 100.

FIG. 3 illustrates one example of a system configuration of the control apparatus 100. The control apparatus 100 includes a processing unit 200, a storage unit 280 and a communication unit 290.

The processing unit 200 conducts the control of the communication unit 290. The communication unit 290 is responsible for the communication between the aggregator server 180 and the vehicle 10. The processing unit 200 is achieved by an arithmetic processing apparatus including a processor. The storage unit 280 is respectively achieved by including a non-volatile storage medium. The processing unit 200 performs processing by using information stored in the storage unit 280. The processing unit 200 may be achieved by a micro-computer including a CPU, a ROM, a RAM, an I/O, a bus and so on. The control apparatus 100 may be achieved by a computer.

In the present embodiment, the control apparatus 100 is achieved by a single computer. However, in another embodiment, the control apparatus 100 may be achieved by a plurality of computers. At least a part of the functionality of the control apparatus 100 may be achieved by one or more servers such as a cloud server.

The processing unit 200 includes a parameter due to travelling calculation unit 210, a remaining usable amount calculation unit 220, a reference difference value calculation unit 230 and a control unit 240. The storage unit 280 includes a guaranteed value storage unit 282 and a reference information storage unit 284.

The guaranteed value storage unit 282 stores a guaranteed value of the parameter indicating usage of the power storage system including a battery included in the vehicle 10 at a predetermined time point in the future. The parameter due to travelling calculation unit 210 calculates the value of the parameter due to travelling, which is the value of the parameter at a predetermined time point due to travelling of the vehicle 10. The remaining usable amount calculation unit 220 calculates, based on a difference value obtained by subtracting the value of the parameter due to travelling from the guaranteed value, the usable remaining usable amount of the battery for the operations other than the travelling of the vehicle 10 until a predetermined time point. The control unit 240 controls, based on the remaining usable amount, to conduct power transmission and reception between the outside of the vehicle 10 and the battery. The outside of the vehicle 10 is, for example, the power grid 90.

The parameter indicating usage may include at least one of a virtual distance of the vehicle 10 including a converted distance obtained by converting the amount of electric power discharged by the vehicle 10 into the travelling distance of the vehicle 10, the total discharge amount of electric power of the battery, the operating time of the vehicle 10 or the number of startups of the vehicle 10.

The control unit 240 controls, based on the remaining usable amount, to conduct transmission and reception of the electric power between the power grid and the battery.

The reference information storage unit 284 stores reference information indicating a relationship between the reference parameter value set so that the value of the parameter reaches the predetermined parameter value that is equal to or less than the guaranteed value at a predetermined time point, and the using period of the vehicle 10. The reference difference value calculation unit 230 calculates the reference difference value that is the difference value between the reference parameter value at current calculated from the reference information, and the value of the parameter at current related to the battery. The control unit 240 further controls, based on the reference difference value calculated by the reference difference value calculation unit 230, to conduct power transmission and reception between the outside of the vehicle 10 and the battery.

The remaining usable amount calculation unit 220 calculates the remaining usable amount, based on the difference value obtained by subtracting the value of the parameter due to travelling and the amount of electric power output from the battery to the outside of the vehicle 10 until current from the guaranteed value. The control unit 240 controls, based on the remaining usable amount, whether or not to prohibit the power transmission and reception between the outside of the vehicle 10 and the battery, and controls, based on the reference difference value calculated by the reference difference value calculation unit 230, whether or not to restrict the power transmission and reception between the outside of the vehicle 10 and the battery.

The remaining usable amount calculation unit 220 calculates the remaining usable amount based on a difference value obtained by subtracting the value of the parameter due to travelling and the amount of electric power output from the battery to the outside of the vehicle 10 until current, from the guaranteed value. The control unit 240 controls, based on the remaining usable amount, whether or not to prohibit or restrict the power transmission and reception between the outside of the vehicle 10 and the battery.

The guaranteed value storage unit 282 stores a guaranteed value for each of the plurality of types of parameters. The parameter due to travelling calculation unit 210 calculates the value of the parameter due to travelling for each of the plurality of types of parameters. The remaining usable amount calculation unit 220 calculates the remaining usable amount for each of the plurality of types of parameters. The reference information storage unit 284 stores the reference information for each of the plurality of types of parameters. The reference difference value calculation unit 230 calculates the reference difference value for each of the plurality of types of parameters. The control unit 240 controls, based on the remaining usable amount calculation unit 220 for each of the plurality of types of parameters, whether or not to prohibit power transmission and reception between the outside of the vehicle 10 and the battery, and controls, based on the reference difference value calculated by the reference difference value calculation unit 230 for each of the plurality of types of parameters, whether or not to restrict power transmission and reception between the outside of the vehicle 10 and the battery.

The control unit 240 may control, based on the least remaining usable amount among the remaining usable amount calculated by the remaining usable amount calculation unit 220 for each of the plurality of types of parameters, whether or not to prohibit power transmission and reception between the outside of the vehicle 10 and the battery, and controls, based on the least difference value among the reference difference value calculated by the reference difference value calculation unit 230 for each of the plurality of types of parameters, whether or not to restrict power transmission and reception between the outside of the vehicle 10 and the battery.

Figure 4:
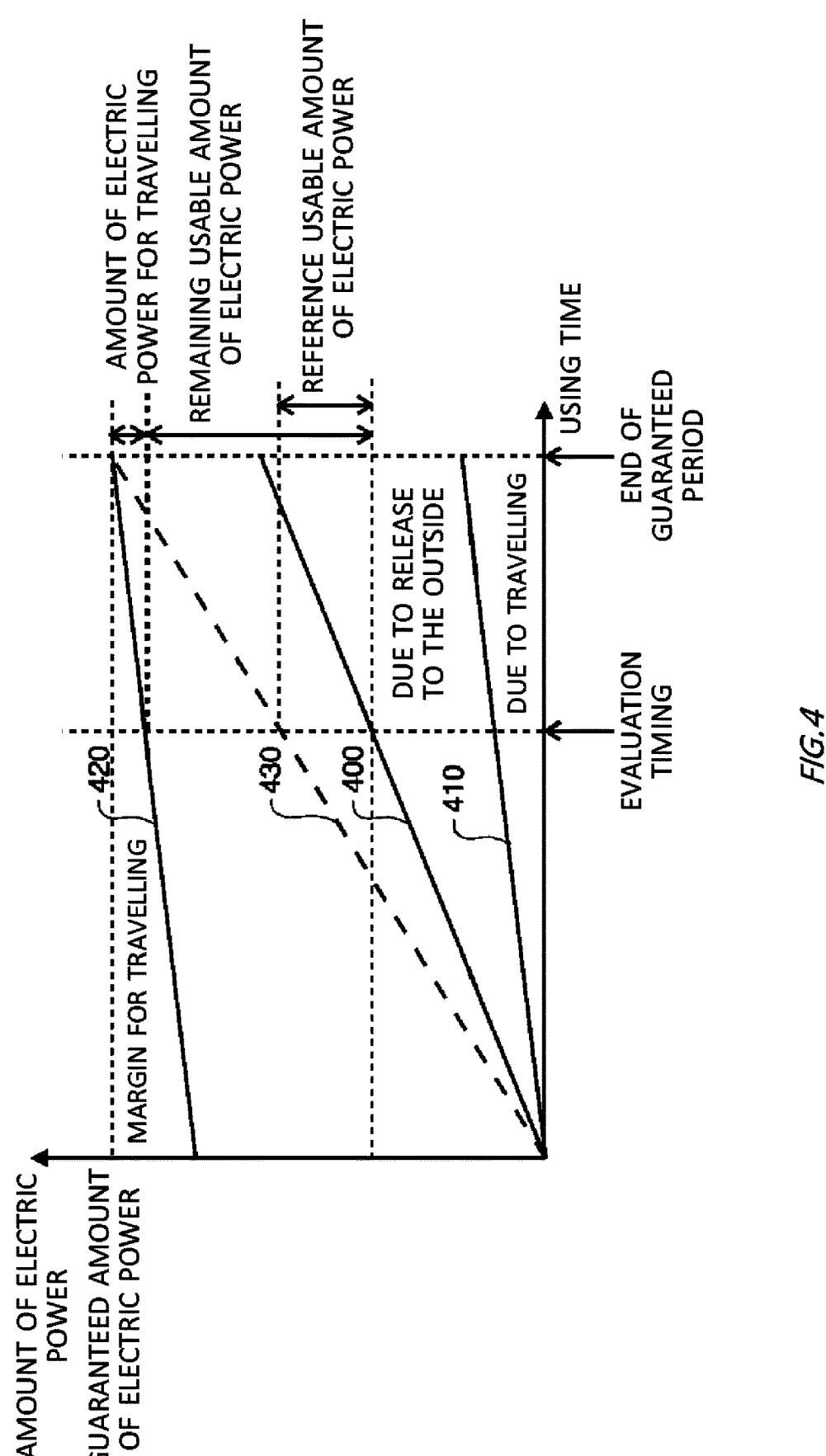
FIG. 4 is a figure for describing parameters used for control of power transmission and reception between the outside of the vehicle 10 and a battery 12.

FIG. 4 is a figure for describing a parameter used in the control of power transmission and reception between the outside of the vehicle 10 and the battery 12. In the graph of FIG. 4, the horizontal axis is time, and the vertical axis is the amount of electric power. The point of origin of the horizontal axis is, for example, the delivery time of the vehicle 10. The vertical axis expresses the discharged amount of electric power of the battery 12. In the present embodiment, the control apparatus 100 controls charging and discharging of the battery 12 so that the amount of electric power output by the battery 12 from the start of use to the end of the designated guaranteed period of the vehicle 10 is equal to or less than a predetermined guaranteed amount of electric power. The guaranteed amount of electric power is the actually guaranteed amount of electric power output by the battery 12.

In FIG. 4, the line 400 indicates the total amount of electric power output from the battery 12. The line 410 indicates the amount of electric power output from the battery 12 due to the travelling of the vehicle 10 (due to travelling). The difference between the line 400 and the line 410 indicates the amount of electric power output from the battery 12 due to the operations other than the travelling of the vehicle 10. In the present embodiment, the difference between the line 400 and the line 410 indicates the amount of electric power released from the battery 12 to the power grid 90 outside the vehicle 10 (due to release to the outside).

The line 420 indicates the amount of electric power that should be ensured for travelling of the vehicle 10 in the future in the guaranteed amount of electric power that can be output by the battery 12 (margin for travelling). The line 430 indicates the assumed amount of electric power when averagely using the battery 12 so that the electric power is output in a guaranteed amount of electric power from the battery 12 from the start of use to the end of guaranteed period of the vehicle 10. That is, when using the battery 12 along the line 430, the total amount of electric power output by the vehicle 10 from the start of use to the end of guaranteed period of the vehicle 10 will match the guaranteed amount of electric power. The reference information indicating the line 430 is stored in the reference information storage unit 284.

The parameter due to travelling calculation unit 210 calculates the amount of electric power of the battery 12 in the end of guaranteed period due to travelling of the vehicle 10. The parameter due to travelling calculation unit 210 may predict the amount of electric power of the battery 12 at the end of guaranteed period due to travelling of the vehicle 10 by extrapolating the variation of the amount of electric power output from the battery 12 due to travelling of the vehicle 10 from the start of use to current of the vehicle 10 until the end of guaranteed period. The value calculated by the parameter due to travelling calculation unit 210 is a total value of the amount of electric power output from the battery 12 due to travelling of the vehicle 10 until current, and the amount of electric power for travelling of FIG. 4.

The remaining usable amount calculation unit 220 calculates the remaining usable amount of electric power at an evaluation timing at current. The remaining usable amount calculation unit 220 calculates the remaining usable amount of electric power by subtracting the total value of the amount of electric power calculated by the parameter due to travelling calculation unit 210 and the amount of electric power output from the battery 12 to the power grid 90 until current, from the guaranteed amount of electric power. The remaining usable amount of electric power corresponds to an upper limit value that can be output from the battery 12 to the power grid 90 until the end of guaranteed period of the vehicle 10.

The reference difference value calculation unit 230 calculates the reference usable amount of electric power at the evaluation timing at current. The reference difference value calculation unit 230 calculates the reference amount of electric power at current referring to the reference information. The reference amount of electric power at current is a value on the line 430 at current. The reference difference value calculation unit 230 calculates the reference usable amount of electric power by subtracting the amount of electric power output from the battery 12 due to travelling of the vehicle 10 until current and the amount of electric power output from the battery 12 to the power grid 90 until current, from the reference amount of electric power. The control unit 240 restricts, based on the remaining usable amount of electric power and the reference usable amount of electric power, charging and discharging of the battery 12.

Figure 5:
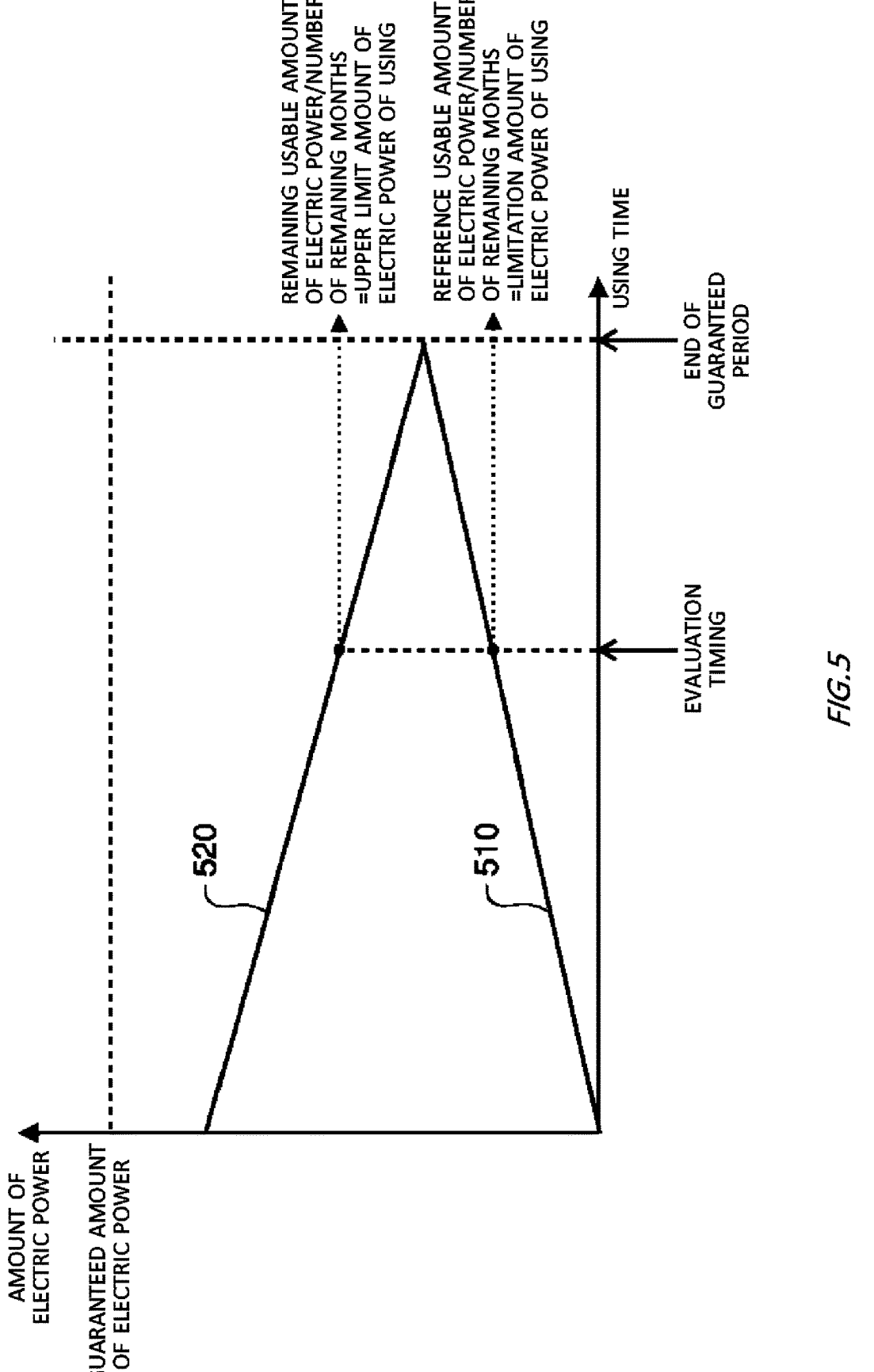
FIG. 5 conceptually illustrates variations of a remaining usable amount of electric power and a reference usable amount of electric power.

FIG. 5 conceptually illustrates the variation of the remaining usable amount of electric power and the reference usable amount of electric power. In FIG. 5, the line 520 expresses the remaining usable amount of electric power, and the line 510 expresses the reference usable amount of electric power.

The control unit 240 calculates the upper limit amount of electric power of using by dividing the remaining usable amount of electric power at current by the number of remaining months until the end of guaranteed period. The upper limit amount of electric power of using corresponds to the amount of electric power that is allowable to be output from the battery 12 to the power grid 90 per month. When the amount of electric power output from the battery 12 to the power grid 90 per month exceeds the upper limit amount of electric power of using, it will exceed the guaranteed amount of electric power until the end of guaranteed period. Therefore, the control unit 240 controls charging and discharging of the battery 12 so that the amount of electric power output from the battery 12 to the power grid 90 per month does not exceed the upper limit amount of electric power of using.

The control unit 240 calculates the limitation amount of electric power of using by dividing the reference usable amount of electric power at current by the number of remaining months until the end of guaranteed period. When the amount of electric power output from the battery 12 to the power grid 90 per month exceeds the limitation amount of electric power of using, it will exceed the line 430 of FIG. 4. Therefore, the control unit 240 controls charging and discharging of the battery 12 so that the amount of electric power output from the battery 12 to the power grid 90 per month does not exceed the limitation amount of electric power of using as possible.

Figure 6:
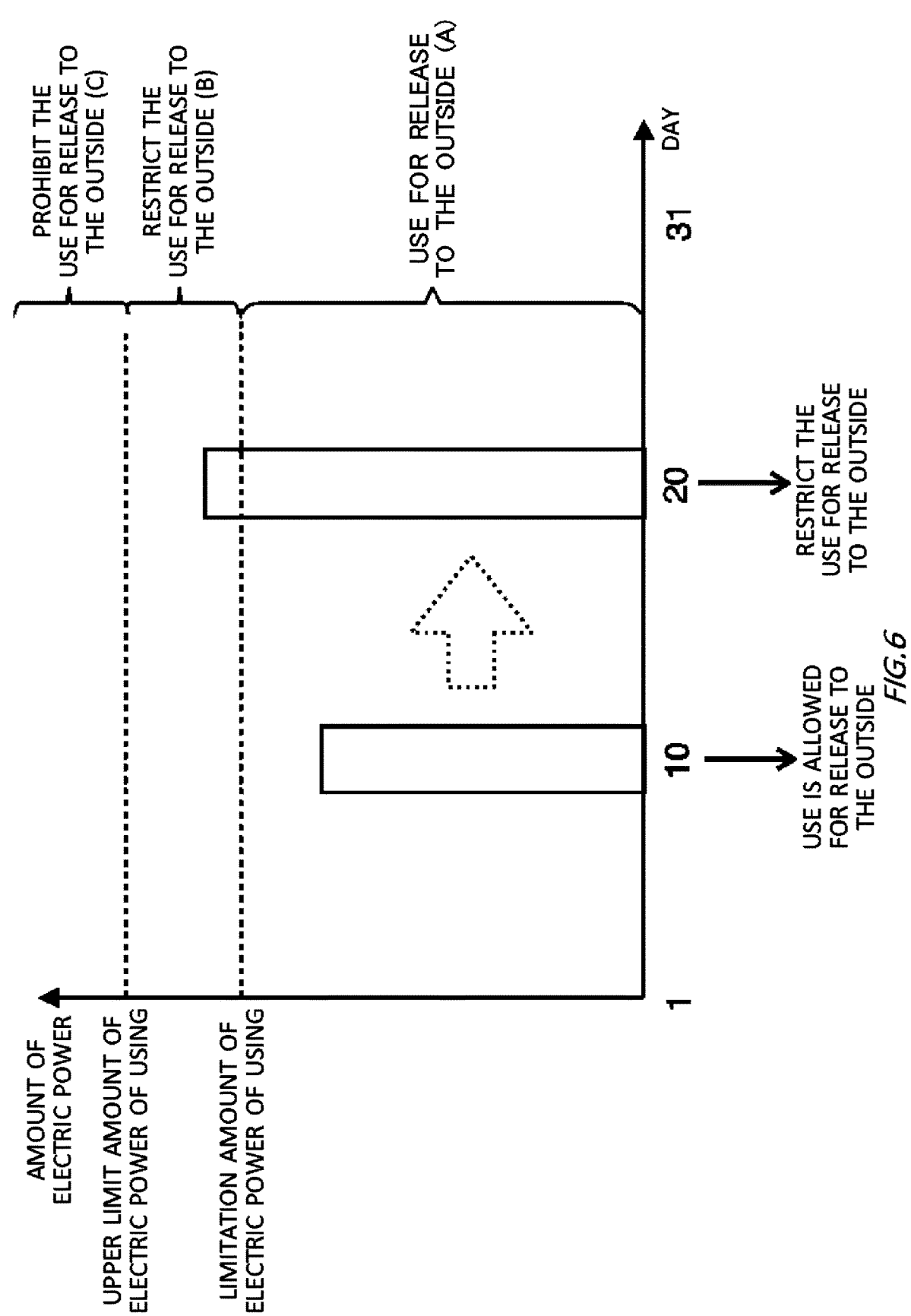
FIG. 6 is a figure for describing the control of a control unit 240.

FIG. 6 is a figure for describing the control of the control unit 240. The vertical axis of FIG. 6 is the amount of electric power output to the power grid 90 within a month. The horizontal axis is the number of days in a month. The amount of electric power output from the battery 12 to the power grid 90 from one day to 10 days is less than the limitation amount of electric power of using. Therefore, the control unit 240 determines that the battery 12 can be used for the power release to the power grid 90 (used for release to the outside).

On the other hand, the amount of electric power output from the battery 12 to the power grid 90 from one day to 20 days exceeds the limitation amount of electric power of using. Therefore, the control unit 240 restricts the using of the battery 12 for power release to the power grid 90 (restrict the use for release to the outside). For example, the control unit 240 uses the battery 12 for power release to the power grid 90, taking the amount of electric power required to be released to the power grid 90 being unable to be released from another battery 12 that is determined as "used for release to the outside" as a condition. The control unit 240 does not use the battery 12 for power release to the power grid 90 when the amount of electric power required to be released to the power grid 90 can be released from another battery 12 that is determined as "used for release to the outside".

Note that when the amount of electric power output from the battery 12 to the power grid 90 exceeds the upper limit amount of electric power of using, the control unit 240 prohibits to use the battery 12 for power release to the power grid 90 (prohibit the use for release to the outside). Also, in FIG. 6, A indicates that the battery 12 may be preferentially selected for power release to the power grid 90. B indicates that the battery 12 may be selected restrictively for power release to the power grid 90. C indicates that the battery 12 may not be selected for power release to the power grid 90. In this manner, A, B and C indicate the priority of using the battery 12 for power release to the power grid 90. Specifically, A indicates a higher priority than B, and B indicates a lower priority than C.

Figure 7:
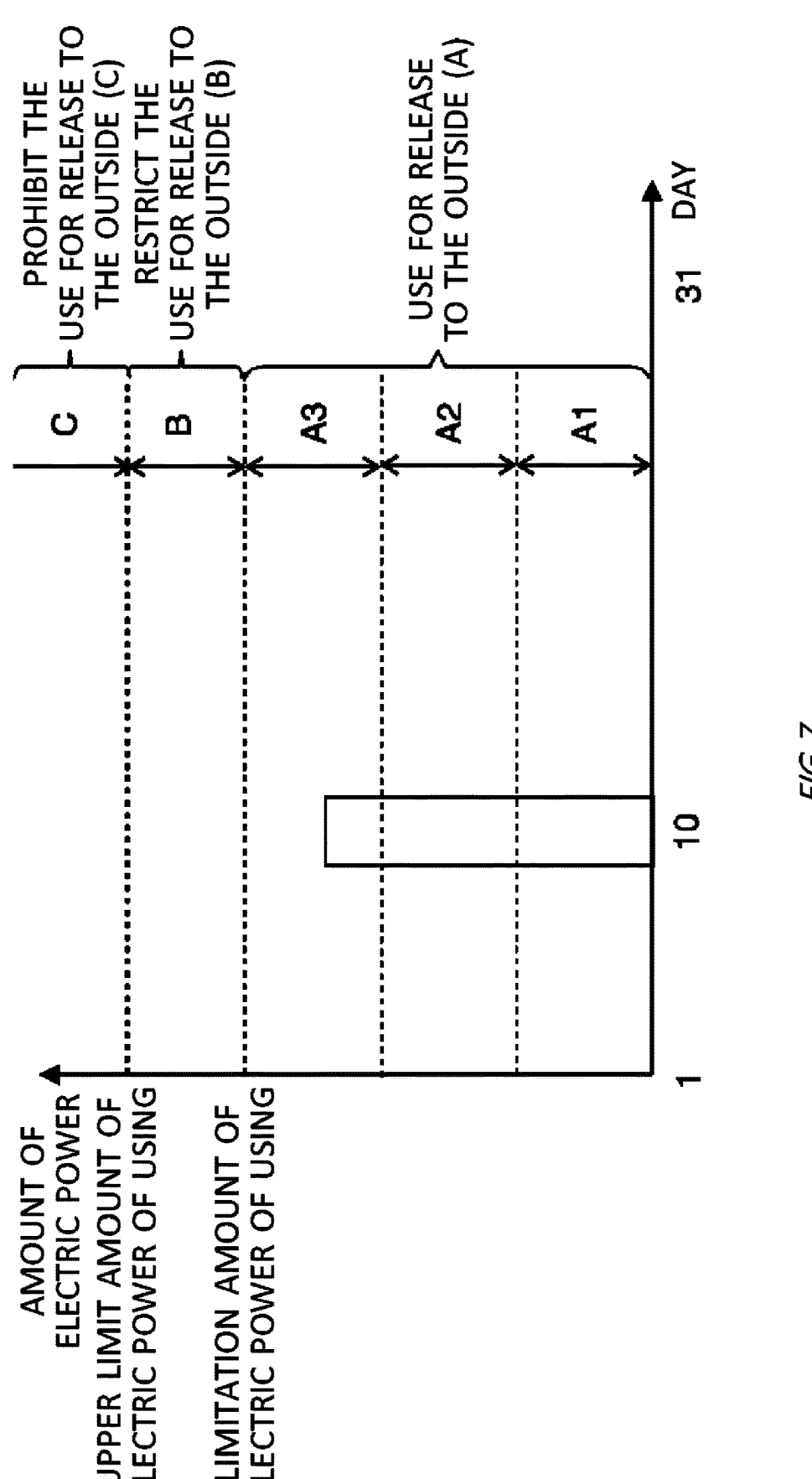
FIG. 7 illustrates an example for dividing a range of A that allows the use for release to the outside into 3 priorities.

FIG. 7 illustrates an example for dividing the range of A that allows the use for release to the outside into 3 priorities. In FIG. 7, the vertical axis is, similarly to FIG. 6, the amount of electric power output to the power grid 90 within a month, and the horizontal axis is the number of days in a month. In FIG. 7, the amount of electric power output from the battery 12 to the power grid 90 from one day to 10 days is shown.

In FIG. 7, the range of A is divided into 3 ranges corresponding to A1, A2 and A3. A1, A2 and A3 indicate the priority of using the battery 12 for power release to the power grid 90. A1 indicates a higher priority than A2, and A2 indicates a higher priority than A3. The amount of electric power output from the battery 12 to the power grid 90 from one day to 10 days is within a range corresponding to A3. Accordingly, the control unit 240 regards the priority of using the battery 12 for power release to the power grid 90 as A3.

Figure 8:
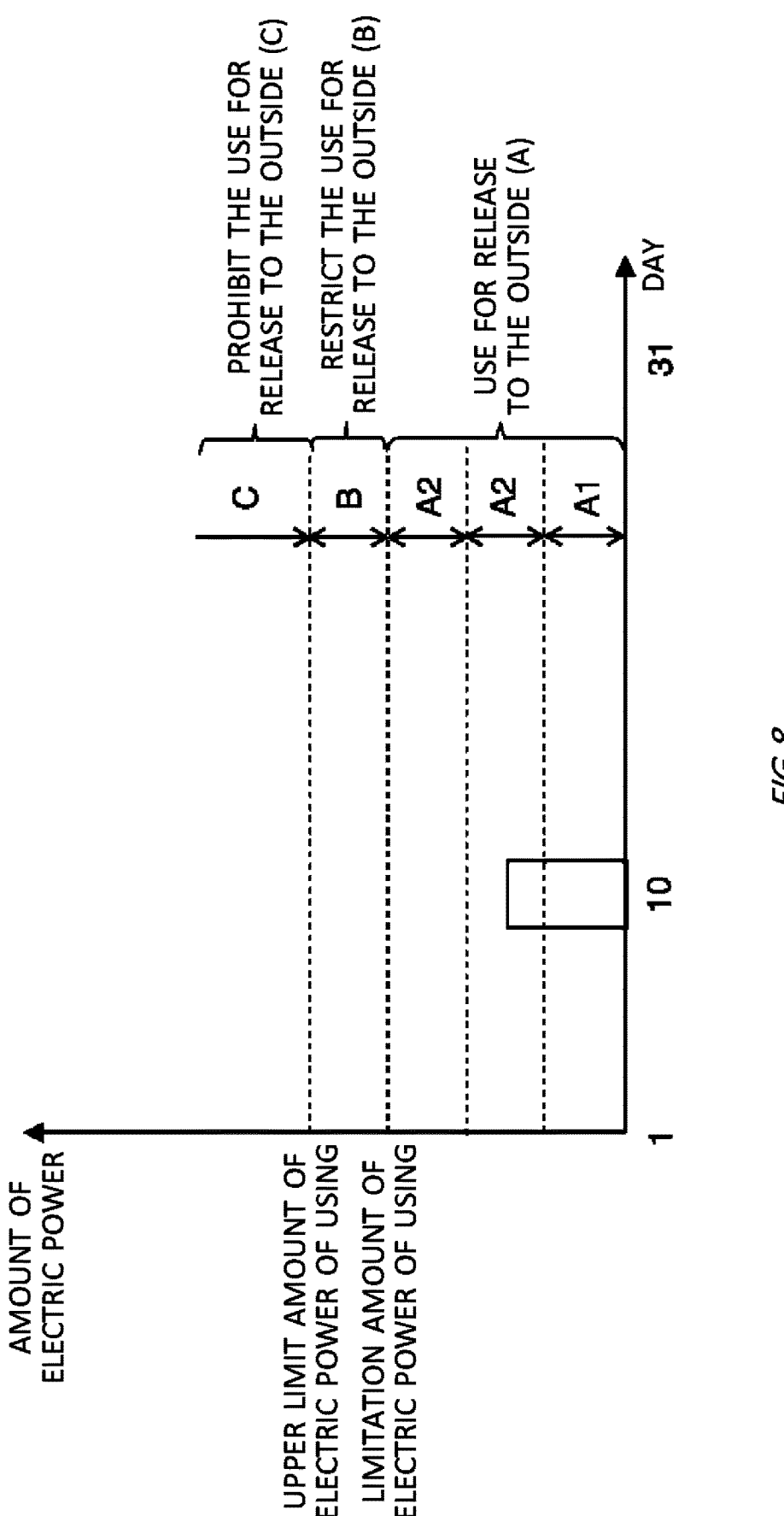
FIG. 8 illustrates a priority in another battery 12.

FIG. 8 illustrates the priority of another battery 12. FIG. 8 is a figure similar to FIG. 7, and the amount of electric power output from another battery 12 to the power grid 90 from one day to 10 days is shown. As shown in FIG. 8, the amount of electric power output from another battery 12 to the power grid 90 from one day to 10 days is within a range corresponding to A2. Accordingly, the control unit 240 regards the priority of using another battery 12 for power release to the power grid 90 as A2.

FIG. 9 indicates the priority set to the battery 12 of each of the vehicles 10. The control unit 240 selects the battery 12 of the vehicle 10 with a priority set to be A1, A2 and A3, as the battery used for electric power release to the power grid 90 in an order of A1, A2 and A3. When the total value of the amount of electric power providable from the battery 12 with a priority set to be A1, A2 or A3 is less than the amount of electric power required to be released to the power grid 90, the control unit 240 selects the battery 12 of the vehicle 10 with the priority set to be B as the battery used for electric power release to the power grid 90.

This enables the release of electric power from the battery 12 to the power grid 90 to be controlled so that the battery 12 does not deteriorate too much in the future within guaranteed period, thus preventing travelling of the vehicle 10 from being interfered in the future. Also, the battery 12 of the vehicle 10 that is rarely used during travelling can be used preferentially for power release to the power grid 90. Therefore, for the user of the vehicle 10, the chances of getting incentives given for the use of the battery 12 for power release to the power grid 90 are increased.

Figure 10:
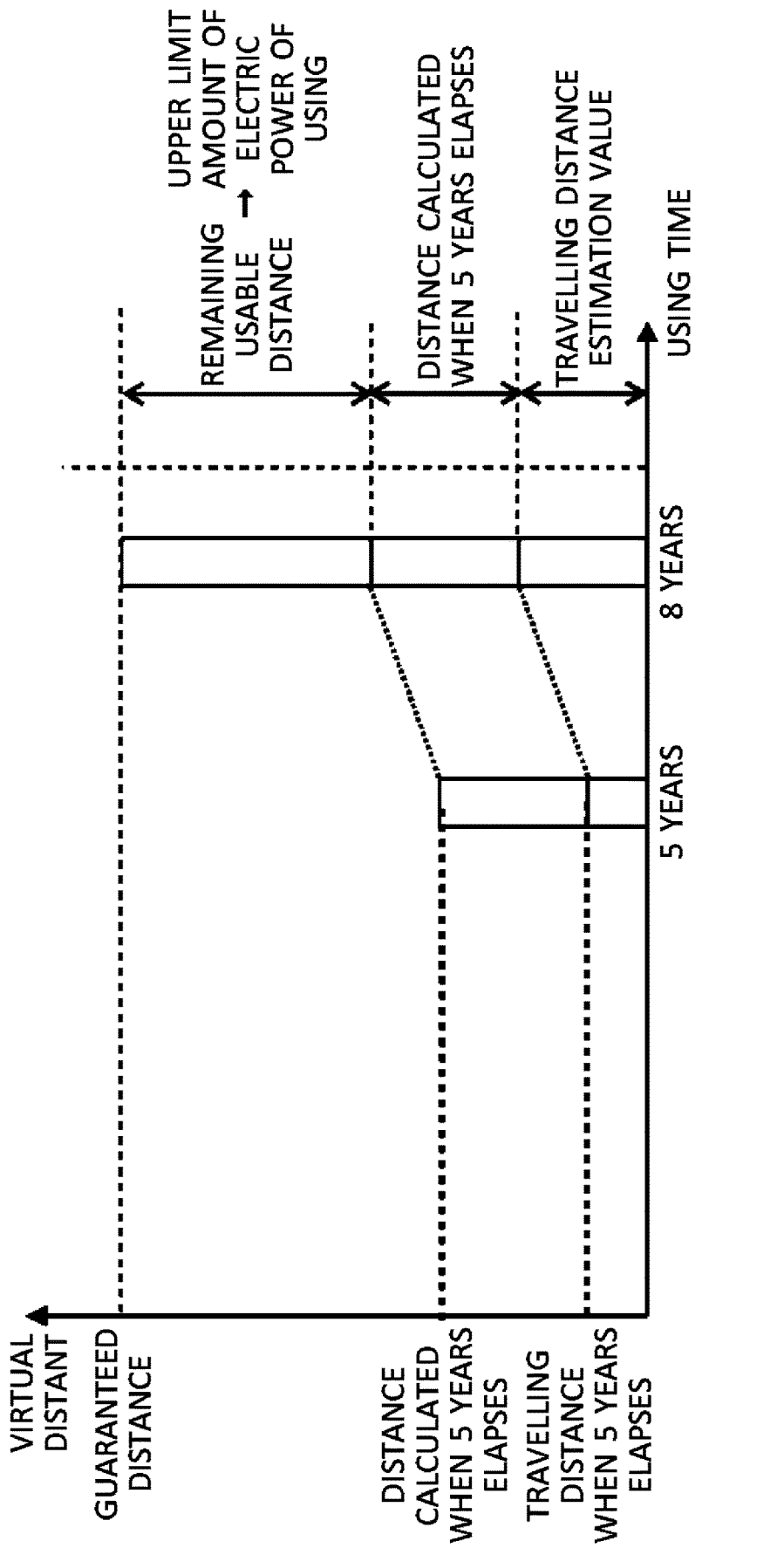
FIG. 10 is a figure for describing a remaining usable distance of the vehicle 10 when using a virtual distance.

FIG. 10 is a figure for describing the remaining usable distance of the vehicle 10 when the virtual distance is used. The virtual distance indicates, with a unit of distance, the total converted distance obtained by converting the travelling distance of the vehicle 10 and the amount of electric power released for operations other than travelling of the vehicle 10 into distance. In FIG. 10, the vertical axis is the distance indicating the virtual distance, and the horizontal axis is the using time of the vehicle 10.

In FIG. 10, the case when conducting evaluation at a timing when 5 years elapses from the start of use of the vehicle 10 is shown. Herein, the end of guaranteed period is regarded as the timing when 8 year elapses from the start of use of the vehicle 10. The parameter due to travelling calculation unit 210 calculates the travelling distance estimation value when 8 years elapses by using the travelling distance when 5 years elapses and the using time of the vehicle 10.

In FIG. 10, the distance converted when 5 years elapses is the value obtained by converting the amount of electric power released from the battery 12 to the power grid 90 to distance until current. The converting from the amount of electric power to the distance is calculated by dividing the amount of electric power by the predetermined electricity consumption. The guaranteed distance is information corresponding to the guaranteed amount of electric power. The guaranteed distance corresponds to a value obtained by dividing the guaranteed amount of electric power by the predetermined electricity consumption.

The remaining usable amount calculation unit 220 calculates the remaining usable distance by subtracting the total value of the distance converted when 5 years elapses and the travelling distance estimation value when 8 years elapses, from the guaranteed distance. The remaining usable distance is information corresponding to the remaining usable amount of electric power. The control unit 240 can calculate the amount of electric power that is allowed to be released from the battery 12 to the power grid 90 per month by dividing the remaining usable distance by the number of remaining months, by using the upper limit distance of using that takes the virtual distance as an indicator.

Figure 11:
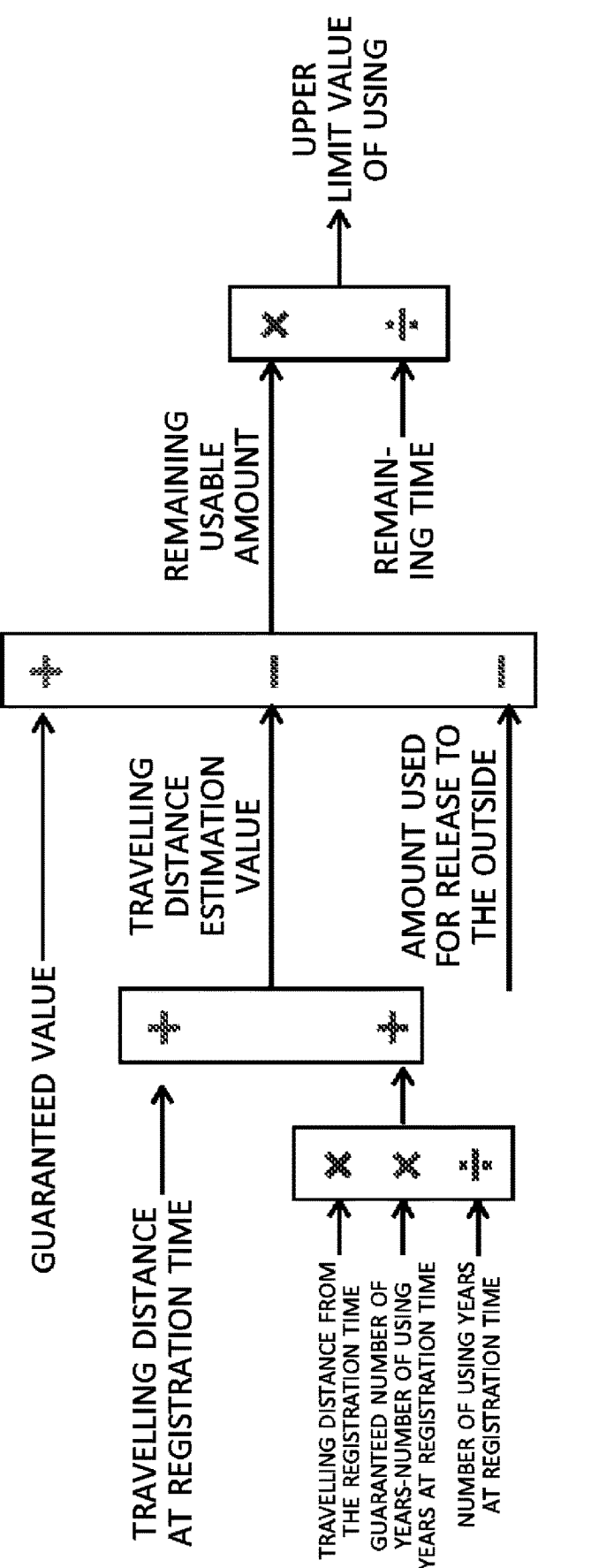
FIG. 11 illustrates an arithmetic content of a control apparatus 100 for calculating an upper limit value of using.

FIG. 11 illustrates the arithmetic content of the control apparatus 100 for calculating the upper limit value of using. The upper limit value of using indicates the amount of electric power that is allowed to be released from the battery 12 to the power grid 90 per month or the distance in the virtual distance. The upper limit value of using corresponds to the upper limit amount of electric power of using when using the amount of electric power as the indicator, and corresponds to the upper limit distance of using when using the virtual distance as the indicator.

First, a prediction of the travelling distance from the time of guaranteed registration to the end of guaranteed period is conducted. The travelling distance from the registration time, the value obtained by subtracting the number of using years of the vehicle 10 at the registration time from the guaranteed number of years and the number of using years at registration time are input. The travelling distance from the registration time is the travelling distance of the vehicle 10 from the timing when the guaranteed registration is performed to current. The guaranteed number of years indicates the period of conducting the output guarantee of the battery 12. In the example of FIG. 10, the guaranteed number of years is 8. The number of using years at registration time indicates the period that has elapsed from the start of use to the time when performing the guaranteed registration of the vehicle 10.

The travelling distance from the time of guaranteed registration to the end of guaranteed period of the vehicle 10 is calculated by multiplying the value obtained by dividing the value, obtained by subtracting the number of using years of the vehicle 10 at the registration time from the guaranteed number of years, by the number of using years at registration time, and the travelling distance from the registration time. The travelling distance estimation value is calculated by adding the travelling distance at registration time to the travelling distance from the time of guaranteed registration to the end of guaranteed period. The travelling distance at registration time is the distance that the vehicle 10 has traveled until the timing when conducting the guaranteed registration. For example, when conducting the guaranteed registration when the user of the vehicle 10 purchases a used car, the travelling distance at registration time corresponds to the total travelling distance of the vehicle 10 already when the used car is purchased. When conducting the guaranteed registration when the user of the vehicle 10 purchases a new car, the travelling distance at registration time becomes 0.

Then, the remaining usable amount is calculated by subtracting the total value of the travelling distance estimation value and the amount used for release to the outside from the guaranteed value. Then, the upper limit value of using per unit time is calculated by dividing the remaining usable amount by the remaining time until the end of guaranteed period. In the example described in connection to FIG. 5 or the like, the number of remaining months until the end of guaranteed period is used as the remaining time until the end of guaranteed period. This enables the upper limit value of using per month when using the battery 12 to conduct power transmission and reception with the power grid 90 to be calculated.

Figure 12:
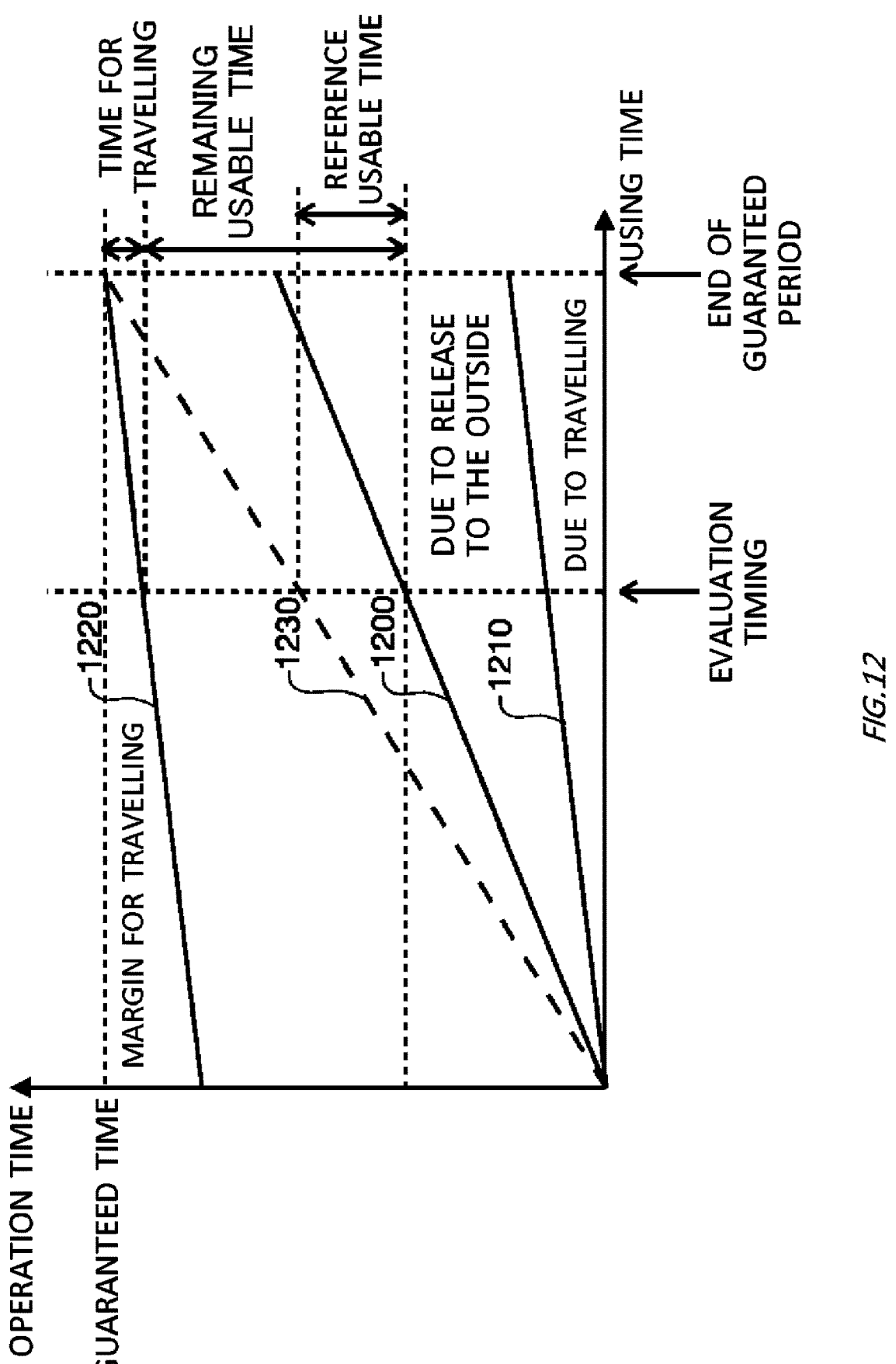
FIG. 12 is a figure for describing another parameter used for the control of power transmission and reception between the outside of the vehicle 10 and the battery 12.

FIG. 12 is a figure for describing another parameter used for control of power transmission and reception between the outside of the vehicle 10 and the battery 12. FIG. 12 is different from FIG. 4 in a point of using the operating time of the appliance 14 as another parameter used for the control of power transmission and reception. In the description of FIG. 12, the description similar to that in connection to FIG. 4 may be omitted.

In the graph of FIG. 12, the horizontal axis is time, and the vertical axis is operating time. The point of origin of the horizontal axis is, for example, the delivery time of the vehicle 10. The vertical axis expresses operating time of the appliance 14. In the present embodiment, the control apparatus 100 controls charging and discharging of the battery 12 so that the operating time of the appliance 14 from the start of use of the vehicle 10 to the end of the designated guaranteed period is equal to or less than the predetermined guaranteed time. The guaranteed time is the time when the operation of the appliance 14 is actually guaranteed.

In FIG. 12, the line 1200 indicates the total operating time operated by the appliance 14. The difference between the line 1210 and the line 1200 indicates the operating time of the appliance 14 due to operations other than travelling of the vehicle 10. The line 1210 indicates the operating time of the appliance 14 due to travelling of the vehicle 10 (due to travelling). In the present embodiment, the difference between the line 1200 and the line 1210 indicates the operating time of the appliance 14 due to conducting the operation of the release of electric power from the battery 12 to the power grid 90 outside the vehicle 10 (due to release to the outside).

The line 1220 indicates the time when the future travelling of the vehicle 10 in the guaranteed time when the appliance 14 can be operated should be ensured (margin for travelling). The line 1230 indicates the operating time assumed when averagely using the appliance 14 so that the appliance 14 only operates during the guaranteed operating time from the start of use to the end of guaranteed period of the vehicle 10. That is, if using the battery 12 along the line 1230, the total operating time of the appliance 14 from the start of use of the vehicle 10 to the end of guaranteed period will match the guaranteed electric power time. The reference information indicating the line 1230 is stored in the reference information storage unit 284.

The parameter due to travelling calculation unit 210 calculates the operating time of the appliance 14 at the end of guaranteed period due to travelling of the vehicle 10. The parameter due to travelling calculation unit 210 may predict the operating time of the appliance 14 at the end of guaranteed period due to travelling of the vehicle 10 by extrapolating the variation of the operating time of the appliance 14 due to travelling from the start of use of the vehicle 10 to current into the end of guaranteed period. The value calculated by the parameter due to travelling calculation unit 210 is a total value of the operating time of the appliance 14 due to travelling of the vehicle 10 until current and the time for travelling in FIG. 12.

The remaining usable amount calculation unit 220 calculates the remaining usable time at the evaluation timing at current. The remaining usable amount calculation unit 220 calculates the remaining usable amount of electric power by subtracting, from the guaranteed time, the total value of the time calculated by the parameter due to travelling calculation unit 210 and the operating time of the appliance 14 until current. The remaining usable amount of electric power corresponds to the upper limit value that allows the appliance 14 to operate until the end of guaranteed period of the vehicle 10.

The reference difference value calculation unit 230 calculates the reference usable time at the evaluation timing at current. The reference difference value calculation unit 230 calculates the reference operating time at current referring to the reference information. The reference operating time at current is a value above the line 430 at current. The reference difference value calculation unit 230 calculates the reference usable time by subtracting the operating time of the appliance 14 until current from the reference time. The control unit 240 restricts the charging and discharging of the battery 12 based on the remaining usable time and the reference usable time.

In this manner, based on the operating time of the appliance 14, the remaining usable time that is a parameter corresponding to the remaining usable amount of electric power of FIG. 4 and the reference usable time that is a parameter corresponding to the reference usable time can be calculated. Accordingly, by using the approach similar to the approach described in connection to FIG. 5 to FIG. 11, the upper limit time of using related to the operating time of the appliance 14 and the restriction time of using related to the operating time of the appliance 14 can be calculated. Note that the upper limit time of using becomes one example of the upper limit value of using described in connection to FIG. 11.

As described above, the discharged amount of electric power of the battery 12 and the operating time of the appliance 14 can be used as the parameter indicating usage of the power storage system 18. The discharged amount of electric power of the battery 12 is one example of the parameter indicating usage of the battery 12. The operating time of the appliance 14 is one example of the parameter indicating usage of the appliance 14.

The number of startups of the appliance 14 can be used as another parameter for indicating the usage of the power storage system 18. The remaining number of usable times and the reference number of usable times can be calculated for the number of startups of the appliance 14 by applying the number of startups of the appliance 14 as the operating time in FIG. 12.

Figure 13:
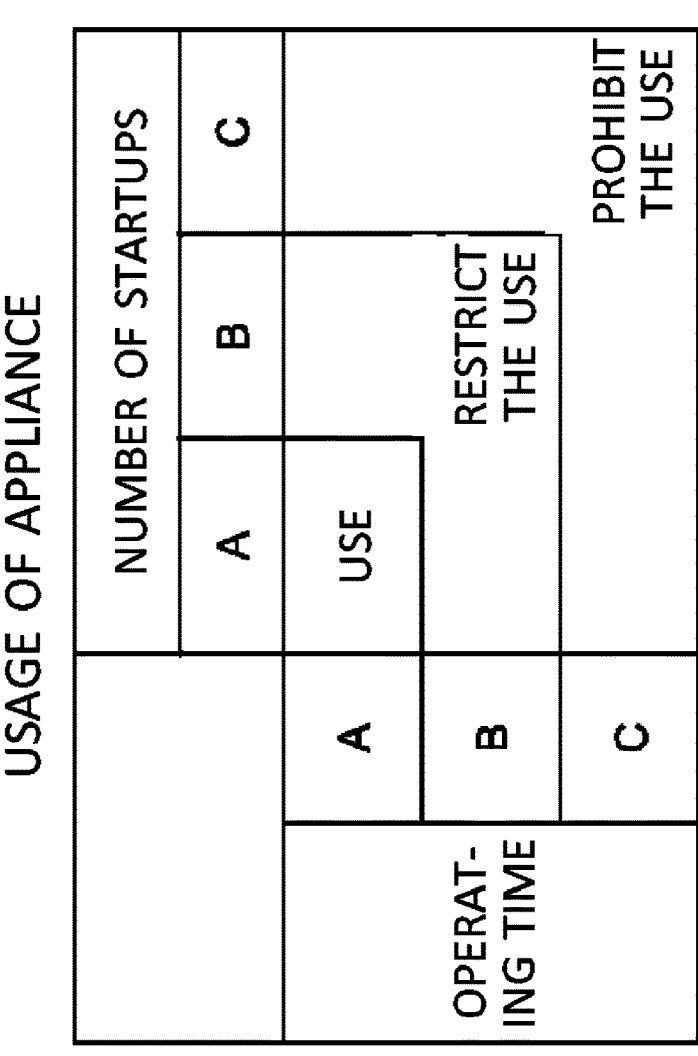
FIG. 13 illustrates one example of a method for calculating a priority of the battery 12.

FIG. 13 indicates one example of the method for calculating the priority of the battery 12 based on the usage of the power storage system 18. As described in connection to FIG. 6 and so on, the control unit 240 can assign A, B and C as the priority when using the amount of electric power of the battery 12 as the parameter. For example, as described above, A indicates that the battery 12 can be used preferentially for power release to the power grid 90, B indicates that the battery 12 can be used restrictively for power release to the power grid 90, and C indicates that the battery 12 can not be used for power release to the power grid 90. That is, the priority can be set based on the parameter indicating usage of the battery 12.

As described in connection to FIG. 13 and so on, the control unit 240 can assign A, B and C as the priority when using the operating time of the appliance 14 as the parameter. Also, as described above, the control unit 240 can assign A, B and C as the priority when using the number of startups of the appliance 14 as the parameter.

The control unit 240 calculates the priority related to the appliance 14 based on the combination of the priority when using the operating time of the appliance 14 as the parameter, and the priority when using the number of startups of the appliance 14 as the parameter. For example, when the priority when using the operating time of the appliance 14 as the parameter is different from the priority when using the number of startups of the appliance 14 as the parameter, the control unit 240 adopts the lower priority as the priority based on the usage of the appliance 14. As one example, when the priority based on the operating time of the appliance 14 is A, and the priority based on the number of startups of the appliance 14 is A, the priority based on the usage of the appliance 14 becomes A. Also, when the priority based on the operating time of the appliance 14 is A, and the priority based on the number of startups of the appliance 14 is B, the priority based on the usage of the appliance 14 becomes B. As shown in FIG. 13, this enables A, B or C to be assigned as the priority based on the usage of the appliance 14.

Then, the control unit 240 determines the priority for using the battery 12 for power transmission and reception with the power grid 90, based on the priority based on the priority based on the usage of the battery 12 and the priority based on the usage of the appliance 14. For example, the control unit 240 adopts the lower priority of the priority based on the usage of the battery 12 and the priority based on the usage of the appliance 14, as the priority for using the battery 12 for power transmission and reception with the power grid 90. As one example, when the priority based on the usage of the battery 12 is A, and the priority based on the usage of the appliance 14 is A, the priority for using the battery 12 for power transmission and reception with the power grid 90 becomes A. Also, when the priority based on the usage of the battery 12 is A, and the priority based on the usage of the appliance 14 is B, the priority for using the battery 12 for power transmission and reception with the power grid 90 becomes B.

The control unit 240 selects the battery 12 used for power transmission and reception with the power grid 90 based on the priority for using the battery 12 for power transmission and reception with the power grid 90. For example, the control unit 240 selects the battery 12 of the vehicle 10 with a priority set to be A as the battery used for releasing electric power to the power grid 90. When the total value of the amount of electric power providable from the battery 12 with a priority set to be A is less than the amount of electric power required to be released to the power grid 90, the control unit 240 selects the battery 12 of the vehicle 10 with the priority set to be B as the battery used for electric power release to the power grid 90.

In the present embodiment, the battery 12 is a battery included in the vehicle 10. In another embodiment, the battery 12 may be a battery not included in the vehicle 10. For example, the battery 12 may be a stationary battery.

The vehicle 10 may be an electric wheeled vehicle including an electric vehicle, a hybrid vehicle, a saddle-riding vehicle such as a electric motorcycle. The vehicle 10 is one example of a mobile object. The mobile object may be any mobile object including a battery, travelling across the land other than a vehicle. The mobile object may include an aircraft such as an unmanned aerial vehicle (UAV), a ship and so on.

Figure 14:
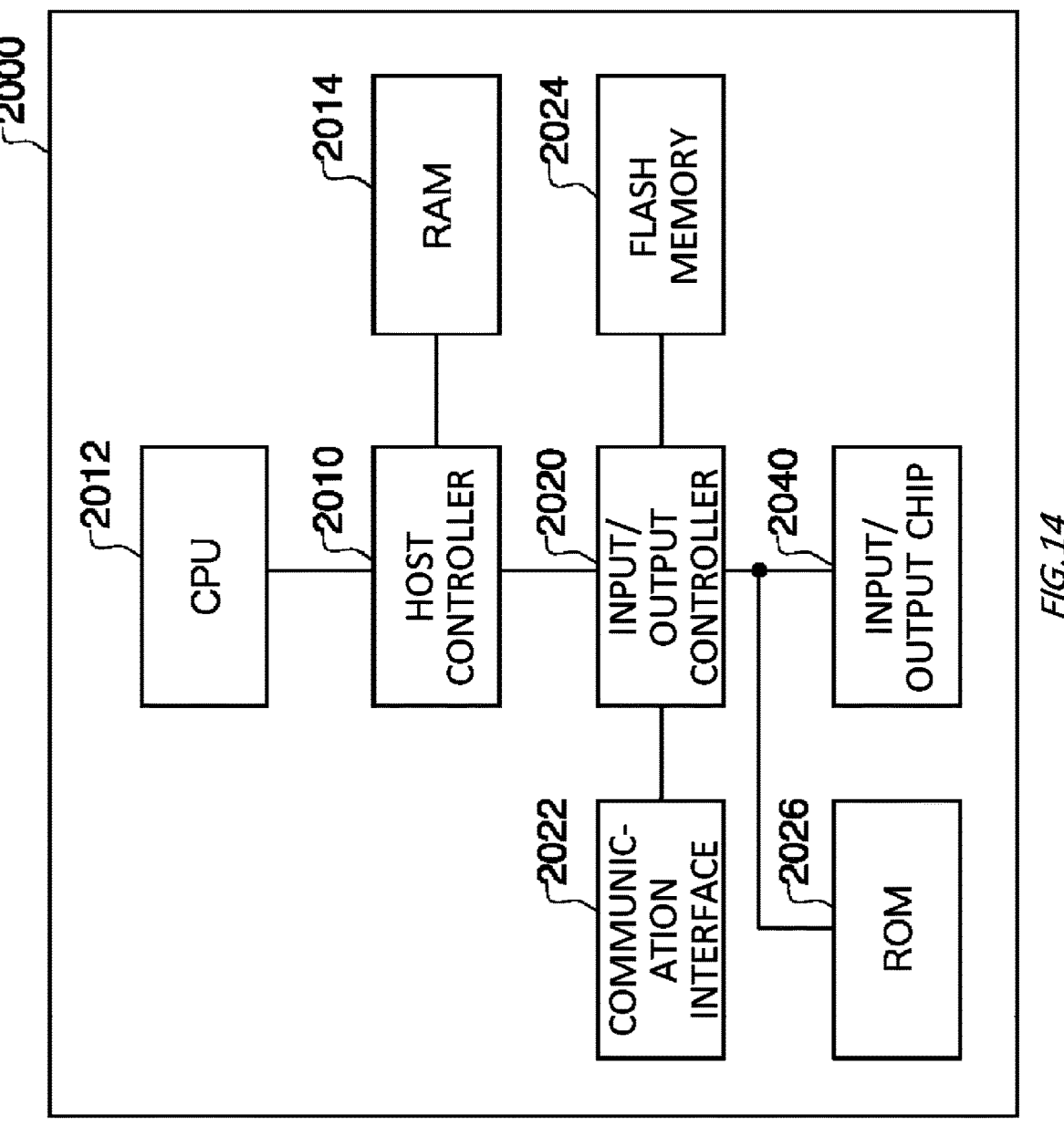
FIG. 14 illustrates an example of a computer 2000.

FIG. 14 shows an example of a computer 2000 in which a plurality of embodiments of the present invention may be entirely or partially embodied. A program installed on a computer 2000 can cause the computer 2000 to function as a system or each unit of the system, or an apparatus or each unit of the apparatus, such as the control apparatus 20, for an embodiment, to perform operations associated with the system or each unit of the system or the apparatus or each unit of the apparatus, and/or to perform a process or a step of a process for an embodiment. Such a program may be executed by a CPU 2012 to cause the computer 2000 to perform certain operations associated with the processing procedures described herein and some of or all of the blocks in the block diagrams.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, thereby controlling each unit.

The communication interface 2022 communicates with other electronic devices via a network. The flash memory 2024 stores programs and data used by the CPU 2012 within the computer 2000. The ROM 2026 stores therein a boot program or the like executed by the computer 2000 at the time of activation, and/or a program depending on the hardware of the computer 2000. The input/output chip 2040 may connect various input/output units such as a keyboard, a mouse, and a monitor to the input/output controller 2020 via input/output ports such as a serial port, a parallel port, a keyboard port, a mouse port, a monitor port, a USB port, and a HDMI (registered trademark) port.

A program is provided via a network or computer-readable storage media such as a CD-ROM, a DVD-ROM, or a memory card. The RAM 2014, the ROM 2026, or the flash memory 2024 is an example of the computer-readable storage medium. Programs are installed in the flash memory 2024, the RAM 2014, or the ROM 2026 and executed by the CPU 2012. The information processing written in these programs is read by the computer 2000, and thereby cooperation between a program and the above-described various types of hardware resources is achieved. A device or method may be constituted by carrying out the operation or processing of information by using the computer 2000.

For example, when communication is carried out between the computer 2000 and an external device, the CPU 2012 may execute a communication program loaded onto the RAM 2014 to instruct communication processing to the communication interface 2022, based on the processing written in the communication program. The communication interface 2022, under control of the CPU 2012, reads transmission data stored on transmission buffering regions provided in recording media such as the RAM 2014 and the flash memory 2024, and transmits the read transmission data to a network and writes reception data received from a network to reception buffering regions or the like provided on the recording media.

In addition, the CPU 2012 may cause all or a necessary portion of a file or a database to be read into the RAM 2014, the file or the database having been stored in a recording medium such as the flash memory 2024, etc., and perform various types of processing on the data on the RAM 2014. The CPU 2012 may then write back the processed data to the recording medium.

Various types of information, such as various types of programs, data, tables, and databases, may be stored in the recording medium to undergo information processing. The CPU 2012 may perform various types of processing on the data read from the RAM 2014, which includes various types of operations, information processing, conditional judging, conditional branch, unconditional branch, search/replace of information, etc., as described herein and designated by an instruction sequence of programs, and writes the result back to the RAM 2014. In addition, the CPU 2012 may search for information in a file, a database, etc., in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among the plurality of entries, and read the attribute value of the second attribute stored in the entry, thereby acquiring the attribute value of the second attribute associated with the first attribute satisfying the predetermined condition.

The programs or software modules described above may be stored in the computer-readable storage medium on the computer 2000 or in the vicinity of the computer 2000. A recording medium such as a hard disk or a RAM provided in a server system connected to a dedicated communication network or the Internet can be used as the computer-readable storage media. A program stored in the computer-readable storage medium may be provided to the computer 2000 via a network.

The program installed in the computer 2000 and causing the computer 2000 to function as the control apparatus 100 may instruct the CPU 2012 or the like to cause the computer 2000 to function as each unit of the control apparatus 100. The information processing described in these programs function as each unit of the control apparatus 100 that is a specific means where various hardware sources described above are in cooperation with softwares by being read by the computer 2000. Then, these specific means implement operations or processing of information corresponding to the intended use of the computer 2000 in this embodiment, so that the control apparatus 100 is constructed as a specific information processing apparatus corresponding to the intended use.

Various embodiments have been described by referring to the block diagrams and the like. In the block diagram, each block may represent (1) a step of a process in which an operation is executed, or (2) each unit of the device having a role of executing the operation. Certain steps and sections may be implemented by dedicated circuitry, programmable circuitry supplied with computer-readable instructions stored on computer-readable storage media, and/or processors supplied with computer-readable instructions stored on computer-readable storage media. Dedicated circuit may include digital and/or analog hardware circuits and may include integrated circuits (IC) and/or discrete circuits. Programmable circuit may include reconfigurable hardware circuits including logical AND, logical OR, logical XOR, logical NAND, logical NOR, and other logical operations, flip-flops, registers, memory elements, etc., such as field-programmable gate arrays (FPGA), programmable logic arrays (PLA), etc.

Computer-readable storage media may include any tangible device that can store instructions for execution by a suitable device, such that the computer-readable storage medium having instructions stored therein forms at least a portion of an article of manufacture including instructions which can be executed to create means for performing processing operations or operations specified in the block diagrams. Examples of the computer-readable storage medium may include an electronic storage medium, a magnetic storage medium, an optical storage medium, an electromagnetic storage medium, a semiconductor storage medium, and the like. More specific examples of the computer readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer-readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

Computer-readable instructions may be provided to a processor of a general purpose computer, special purpose computer, or other programmable data processing device, or to programmable circuit, locally or via a local area network (LAN), wide area network (WAN) such as the Internet, etc., to execute the computer-readable instructions to provide means for performing described processing procedure or operations specified in the block diagrams. Examples of the processor include a computer processor, a processing unit, a microprocessor, a digital signal processor, a controller, a microcontroller, and the like.

While the embodiments of the present invention have been described, the technical scope of the present invention is not limited to the above-described embodiments. It is apparent to persons skilled in the art that various alterations or improvements can be made to the above-described embodiments. It is also apparent from the description of the claims that the embodiments to which such alterations or improvements are made can be included in the technical scope of the present invention.

The operations, procedures, steps, and stages of each process performed by an apparatus, system, program, and method shown in the claims, specification, or drawings can be achieved in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

EXPLANATION OF REFERENCES

5: system; 10: vehicle; 12: battery; 14: appliance; 18: power storage system; 20: control apparatus; 30: charging and discharging facility; 42: dwelling unit; 44: facility; 70: power consumer; 80: power generating apparatus; 90: power grid; 100: control apparatus; 180: aggregator server; 190: communication network; 200: processing unit; 210: parameter due to travelling calculation unit; 220: remaining usable amount calculation unit; 230: reference difference value calculation unit; 240: control unit; 280: storage unit; 282: guaranteed value storage unit; 284: reference information storage unit; 290: communication unit; 2000: computer; 2010: host controller; 2012: CPU; 2014: RAM; 2020: input/output controller; 2022: communication interface; 2024: flash memory; 2026: ROM; 2040: input/output chip.

What is claimed is:

1. A control apparatus comprising:

a guaranteed value storage unit configured to store a guaranteed amount of electric power indicating a total discharge amount of electric power that is guaranteed to be output from a battery included in a mobile object from a start of using the mobile object until a predetermined time point in future;

a parameter due to travelling calculation unit configured to calculate an amount of electric power due to travelling indicating an amount of electric power that is output from the battery from the start of using the mobile object until the predetermined time point due to a travelling of the mobile object;

a remaining usable amount calculation unit configured to calculate, based on a difference value obtained by subtracting the amount of electric power due to travelling and an amount of electric power that has been output from the battery to an outside of the mobile object from the start of using the mobile object until a present time point from the guaranteed amount of electric power, a remaining usable amount of electric power indicating an amount of electric power that can be output from the battery for operations other than the travelling of the mobile object from the present time point until the predetermined time point; and a control unit configured to control, based on the remaining usable amount of electric power, to conduct power transmission and reception between the outside of the mobile object and the battery.

2. The control apparatus according to claim 1, wherein the control unit is configured to control, based on the remaining usable amount of electric power, to conduct transmission and reception of electric power between a power grid and the battery.

3. The control apparatus according to claim 1, further comprising a reference information storage unit configured to store reference information indicating a relationship between a reference amount of electric power set so that the total discharge amount of electric power output from the battery from the start of using the mobile object until the predetermined time point in future reaches a pre-determined value that is equal to or less than the guaranteed amount of electric power, and a using period of the mobile object; and a reference difference value calculation unit configured to calculate a reference difference value that is a differ-ence value between the reference amount of electric power at the present time point calculated from the reference information and the amount of electric power output from the battery from the start of using the mobile object until the present time point, wherein the control unit further controls, based on the reference difference value calculated by the reference difference value calculation unit, to conduct power transmission and reception between the outside of the mobile object and the battery.

4. The control apparatus according to claim 3, wherein:

the control unit controls, based on the remaining usable amount of electric power, whether or not to prohibit power transmission and reception between the outside of the mobile object and the battery, and controls, based on the reference difference value calculated by the reference difference value calculation unit, whether or not to restrict power transmission and reception between the outside of the mobile object and the battery.

5. The control apparatus according to claim 1, wherein:

the control unit controls, based on the remaining usable amount of electric power, whether or not to prohibit or restrict power transmission and reception between the outside of the mobile object and the battery.

6. The control apparatus according to claim 2, further comprising a reference information storage unit configured to store reference information indicating a relationship between a reference amount of electric power set so that the total discharge amount of electric power output from the battery from the start of using the mobile object until the predetermined time point in future reaches a pre-determined value that is equal to or less than the guaranteed amount of electric power, and a using period of the mobile object; and a reference difference value calculation unit configured to calculate a reference difference value that is a differ-ence value between the reference amount of electric power at the present time point calculated from the reference information and the amount of electric power output from the battery from the start of using the mobile object until the present time point, wherein the control unit further controls, based on the reference difference value calculated by the reference difference value calculation unit, to conduct power transmission and reception between the outside of the mobile object and the battery.

7. The control apparatus according to claim 6, wherein:

the control unit controls, based on the remaining usable amount of electric power, whether or not to prohibit power transmission and reception between the outside of the mobile object and the battery, and controls, based on the reference difference value calculated by the reference difference value calculation unit, whether or not to restrict power transmission and reception between the outside of the mobile object and the battery.

8. The control apparatus according to claim 2, wherein:

the control unit controls, based on the remaining usable amount of electric power, whether or not to prohibit or restrict power transmission and reception between the outside of the mobile object and the battery.

9. The control apparatus according to claim 1, wherein the mobile object is a vehicle.

10. A mobile object comprising the control apparatus according to claim 1.

11. A method, comprising:

storing a guaranteed amount of electric power indicating a total discharge amount of electric power that is guaranteed to be output from a battery included in a mobile object from a start of using the mobile object until a predetermined time point in future;

calculating an amount of electric power due to travelling indicating an amount of electric power that is output from the battery from the start of using the mobile object until the predetermined time point due to a travelling of the mobile object;

calculating, based on a difference value obtained by subtracting the amount of electric power due to trav-elling and an amount of electric power that has been output from the battery to an outside of the mobile object from the start of using the mobile object until a present time point from the guaranteed amount of electric power, a remaining usable amount of electric power indicating an amount of electric power that can be output from the battery for operations other than the travelling of the mobile object from the present time point until the predetermined time point; and controlling, based on the remaining usable amount of electric power, to conduct power transmission and reception between the outside of the mobile object and the battery.

12. A non-transitory computer readable storage medium with a program stored therein, the program causes a com-puter to function as:

a guaranteed value storage unit configured to store a guaranteed amount of electric power indicating a total discharge amount of electric power that is guaranteed to be output from a battery included in a mobile object from a start of using the mobile object until a prede-termined time point in future;

a parameter due to travelling calculation unit configured to calculate an amount of electric power due to trav-elling indicating an amount of electric power that is output from the battery from the start of using the mobile object until the predetermined time point due to a travelling of the mobile object;

a remaining usable amount calculation unit configured to calculate, based on a difference values obtained by subtracting the amount of electric power due to trav-elling and an amount of electric power that has been output from the battery to an outside of the mobile object from the start of using the mobile object until a present time point from the guaranteed amount of electric power, a remaining usable amount of electric power indicating an amount of electric power that can be output from the battery for operations other than the travelling of the mobile object from the present time point until the predetermined time point; and a control unit configured to control, based on the remaining usable amount of electric power, to conduct power transmission and reception between the outside of the mobile object and the battery.

\* \* \* \* \*